(12) United States Patent
Fujino et al.

(10) Patent No.: US 11,923,911 B2
(45) Date of Patent: Mar. 5, 2024

(54) HYDROACOUSTIC COMMUNICATION SYSTEM AND RECEIVING APPARATUS

(71) Applicant: Nippon Telegraph and Telephone Corporation, Tokyo (JP)

(72) Inventors: Yosuke Fujino, Tokyo (JP); Hiroyuki Fukumoto, Tokyo (JP); Marina Nakano, Tokyo (JP); Kazunori Akabane, Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 179 days.

(21) Appl. No.: 17/291,850

(22) PCT Filed: Nov. 14, 2019

(86) PCT No.: PCT/JP2019/044684
§ 371 (c)(1),
(2) Date: May 6, 2021

(87) PCT Pub. No.: WO2020/105538
PCT Pub. Date: May 28, 2020

(65) Prior Publication Data
US 2022/0014278 A1 Jan. 13, 2022

(30) Foreign Application Priority Data
Nov. 22, 2018 (JP) .................................. 2018-219638

(51) Int. Cl.
*H04B 11/00* (2006.01)
*H04B 13/02* (2006.01)

(52) U.S. Cl.
CPC ............. *H04B 11/00* (2013.01); *H04B 13/02* (2013.01)

(58) Field of Classification Search
CPC ...... H04B 11/00; H04B 13/02; H04B 7/0617; Y02D 30/70; G04B 7/0848
(Continued)

(56) References Cited

U.S. PATENT DOCUMENTS 6,201,499 B1 * 3/2001 Hawkes ................ H04W 64/00
455/456.1
2006/0076854 A1 4/2006 Deserno et al.
(Continued)

FOREIGN PATENT DOCUMENTS

JP H08-331065 12/1996
WO WO 2009/017230 2/2009

OTHER PUBLICATIONS

Li et al., "MIMO-OFDM for High-Rate Underwater Acoustic Communications," in IEEE Journal of Oceanic Engineering, vol. 34, No. 4, pp. 634-644, (2009) (Year: 2009).*
(Continued)

*Primary Examiner* — Yuqing Xiao
*Assistant Examiner* — Christopher Richard Walker
(74) *Attorney, Agent, or Firm* — Fish & Richardson P.C.

(57) ABSTRACT

An underwater acoustic communication system includes a transmission device including N transmitters, and a reception device. The reception device includes M (M is an integer of two or more) receivers configured to receive M reception signal sequences corresponding to N transmission signal sequences transmitted from the N transmitters through sound waves, a beam former configured to suppress multipath waves other than direct waves of the M received reception signal sequences and to generate L (L is an integer of two or more) signal sequences from the M reception signal sequences, and a signal estimation unit configured to estimate the N transmission signal sequences based on the L generated signal sequences.

10 Claims, 4 Drawing Sheets

(58) Field of Classification Search
USPC .......................................................... 367/138
See application file for complete search history.

(56) References Cited

U.S. PATENT DOCUMENTS

| | | | |
|---|---|---|---|
| 2010/0135203 A1* | 6/2010 | Maru ................... | H04B 7/0854 370/328 |
| 2011/0002191 A1* | 1/2011 | DeMaio ................ | G01S 7/5273 367/87 |
| 2013/0083942 A1* | 4/2013 | Hgren .................... | H04R 3/005 381/92 |
| 2014/0269201 A1* | 9/2014 | Liu ........................ | H04B 13/02 367/131 |
| 2014/0276069 A1 | 9/2014 | Amble et al. | |
| 2020/0271768 A1* | 8/2020 | Nagai ................... | G01S 7/6263 |

OTHER PUBLICATIONS

Ko et al., "The Performance Analysis of MIMO-Beamforming Technologies for Underwater Channel Environments," 2012 Oceans—Yeosu, IEEE, May 21, 2012, pp. 1-4.

Li et al., "MIMO-OFDM for High-Rate Underwater Acoustic Communications," IEEE Journal of Oceanic Engineering, Oct. 2009, 34(4):634-644.

PCT International Search Report in International Appln. No. PCT/JP2019/044684, dated Dec. 10, 2019, 4 pages (with English Translation).

Shimura et al., "Study of MIMO Communication and Multi-User Communication Using Phase Conjugation in Underwater Acoustic Communication," Proceedings of the 2017 Spring Meeting of the Acoustical Society of Japan, Mar. 2017, pp. 1317-1318.

Ukai et al., "Multistage SIMO-Model-Based Blind Source Separation Combining Frequency-Domain ICA and Time-Domain ICA," IEICE Trans. Fundamentals, Mar. 2005, E88-A(3):642-650.

Zhang et al., "Underwater sensing and communication platform," Proceedings of Oceans 2011 IEEE, Santander, Spain, Jun. 6-9, 2011, 6 pages.

[No Author Listed], "Fixed Radio Systems; Point-to-point equipment; Specific aspects of the spatial frequency reuse method; Draft ETSI TR 102 311," European Telecommunications Standards Institute (ETSI), Oct. 2015, ATTM-TM4(V2.0.1), 45 pages.

Song et al., "A 60GHz LOS MIMO Backhaul Design Combining Spatial Multiplexing and Beamforming for a 100Gbps Throughput," 2015 IEEE Global Communications Conference (GLOBECOM), San Diego, CA, USA, Dec. 6-10, 2015, 6 pages.

* cited by examiner

HYDROACOUSTIC COMMUNICATION SYSTEM AND RECEIVING APPARATUS

CROSS-REFERENCE TO RELATED APPLICATIONS

This application is a National Stage application under 35 U.S.C. § 371 of International Application No. PCT/JP2019/044684, having an International Filing Date of Nov. 4, 2019, which claims priority to Japanese Application Serial No. 2018-219638, filed on Nov. 22, 2018. The disclosure of the prior application is considered part of the disclosure of this application, and is incorporated in its entirety into this application.

TECHNICAL FIELD

The present invention relates to an underwater acoustic communication system (Hydroacoustic communication system) and a reception device.

BACKGROUND ART

In underwater acoustic communication, a frequency band usable for a sound wave serving as a carrier wave is limited. To accelerate communication, an underwater acoustic communication system uses a plurality of transmitters transmitting sound waves to spatially multiplex a plurality of signal sequences in some cases. The underwater acoustic communication system uses MIMO (Multiple Input Multiple Output) technology to efficiently spatially multiplex the plurality of signal sequences in some cases.

In aerial wireless communication such as a wireless LAN (Local Area Network), the MIMO technology is widely used. During a time when a reception device receives a signal sequence of one packet in the wireless communication, a propagation path of the wireless communication little changes. Accordingly, a preamble for estimation of a propagation path response of the wireless communication is disposed at a head of the packet of the signal sequence. The wireless communication system can estimate the propagation path response of the wireless communication based on the preamble disposed at the head of the packet of the signal sequence.

In the underwater acoustic communication, since the frequency band usable for the sound wave serving as the carrier wave is limited, a length of the packet of the signal sequence in the underwater acoustic communication is longer than a length of the packet of the signal sequence in the aerial wireless communication. A propagation speed of the sound wave, however, is extremely lower than a propagation speed of an electric wave. Therefore, the length of the packet to a wavelength of the sound wave of the signal sequence in the underwater acoustic communication is extremely shorter than the length of the packet to a wavelength of the electric wave of the signal sequence in the wireless communication. In the underwater acoustic communication, the propagation path of the underwater acoustic communication largely changes during the time when the reception device receives the signal sequence of one packet. Accordingly, the existing underwater acoustic communication system may not estimate the propagation path response of the underwater acoustic communication based on the preamble disposed at the head of the packet of the signal sequence.

A method in which an underwater acoustic communication system complements signal sequences among pilot subcarriers of OFDM (Orthogonal Frequency Division Multiplexing) disposed on a frequency axis, and the underwater acoustic communication system estimates the propagation path response of the underwater acoustic communication for each symbol of the signal sequences has been disclosed (see Non-Patent Document 1).

FIG. 5 is a diagram illustrating a configuration example of an existing underwater acoustic communication system 1a. The underwater acoustic communication system 1a includes a transmission device 2a and a reception device 3a. The transmission device 2a includes a modulation unit and N (N is an integer of two or more) transmitters. In the following, a signal sequence to be transmitted is referred to as a "transmission signal sequence". In the following, a received signal sequence is referred to as a "reception signal sequence". The modulation unit modulates N transmission signal sequences to generate N modulation signals. The N transmitters convert the N modulation signals into sound waves. The N transmitters use the sound waves as carrier waves to emit the N modulation signals into water.

The reception device 3a includes M (M is an integer of two or more) receivers, an estimation unit, and a demodulation unit. The M receivers convert the received sound waves into M reception signal sequences. The estimation unit estimates propagation path responses from the N transmitters to the M receivers based on the M reception signal sequences. The demodulation unit demodulates the N transmission signal sequences from the M reception signal sequences based on the estimated propagation path responses.

In Non-Patent Document 1, the underwater acoustic communication system measures a phase-amplitude response in a specific frequency domain. The underwater acoustic communication system performs inverse fast Fourier transform on a measurement result to convert the measurement result into a phase-amplitude response in a time domain. The underwater acoustic communication system estimates the propagation path response in the time domain based on the converted measurement result in the time domain.

CITATION LIST

Non-Patent Document

Non-Patent Document 1: B. Li, J. Huang, S. Zhou, K. Ball, M. Stojanovic, L. Freitag, and P. Willett, "MIMO-OFDM for High-Rate Underwater Acoustic Communications," IEEE JOURNAL OF OCEANIC ENGINEERING, VOL. 34, NO. 4, OCTOBER 2009.

SUMMARY OF THE INVENTION

Technical Problem

FIG. 6 is a diagram illustrating examples of a direct wave signal of a pilot signal and a multipath wave signal of the pilot signal. A lateral axis represents a frequency (subcarrier number). A vertical axis represents reception power. In FIG. 6, a direct wave signal 200 of the pilot signal, multipath wave signals 201 and 202 of the pilot signal, and data signals 300 to 303 are illustrated. Sound waves transmitted from transmitters arrive receptors through various paths (multiple paths) due to reflection and diffraction. Therefore, arrival angles of the sound waves are different depending on the paths of the sound waves. In a case where the transmission device or the reception device moves, independent Doppler variation occurs on the sound waves respectively.

In the underwater acoustic communication, the propagation speed of the sound wave is extremely low, and Doppler variation is extremely large. Therefore, at a certain frequency or more, or at a certain moving speed or more, the multipath wave signals 201 and 202 of the pilot subcarrier (pilot signal) leak to adjacent subcarriers used for transmission of the data signals 300 to 303. In this case, the existing underwater acoustic communication system cannot estimate propagation path responses with high accuracy. This is a problem.

Note that, in a case where a wide subcarrier interval is secured, leakage of the multipath wave signals to the adjacent subcarriers can be avoided. The existing underwater acoustic communication system, however, cannot estimate the arrival direction of a long delay wave in the underwater acoustic communication because the symbol length of the OFDM becomes short. This is a problem.

As described above, in the case where the transmission device transmitting the signal sequences by using the sound waves and the reception device receiving the transmitted signal sequences perform the underwater acoustic communication, the multipath waves of the signal sequences may straddle a plurality of subcarriers on the frequency axis. For example, in a case where the transmission device or the reception device moves in water, or in a case where the transmission device and the reception device perform the underwater acoustic communication of several ten kbps or more, the existing underwater acoustic communication system cannot estimate the propagation path responses of the underwater acoustic communication with high accuracy. In the case where the propagation path responses of the underwater acoustic communication are not estimated with high accuracy, the existing underwater acoustic communication system cannot improve efficiency of underwater spatial multiplex transmission. This is a problem.

In consideration of the above-described circumstances, an object of the present invention is to provide an underwater acoustic communication system and a reception device that make it possible to improve efficiency of underwater spatial multiplex transmission.

Means for Solving the Problem

According to an aspect of the present invention, an underwater acoustic communication system includes a transmission device including N (N is an integer of two or more) transmitters, and a reception device. The reception device includes M (M is an integer of two or more) receivers configured to receive M reception signal sequences corresponding to N transmission signal sequences transmitted from the N transmitters through sound waves, a beam former configured to suppress multipath waves other than direct waves of the M received reception signal sequences and to generate L (L is an integer of two or more) signal sequences from the M reception signal sequences, and a signal estimation unit configured to estimate the N transmission signal sequences based on the L generated signal sequences.

According to an aspect of the present invention, in the above-described underwater acoustic communication system, a result value obtained by multiplying an interval of the transmitters and an interval of the receivers is an integer multiple of a result value obtained by dividing a result value obtained by multiplying a wavelength of the sound waves and a distance between the transmitters and the receivers, by a number of the receivers.

According to an aspect of the present invention, in the above-described underwater acoustic communication system, in a case where the transmission device is installed near a bottom of water, the N transmitters each have directivity of a sound wave directed toward a water surface, and in a case where the reception device is installed near the water surface, the M receivers each have directivity of a sound wave arriving from the bottom of water.

According to an aspect of the present invention, in the above-described underwater acoustic communication system, in a case where the transmission device is installed near a water surface, the N transmitters each have directivity of a sound wave directed toward a bottom of water, and in a case where the reception device is installed near the bottom of water, the M receivers each have directivity of a sound wave arriving from the water surface.

According to an aspect of the present invention, in the above-described underwater acoustic communication system, the beam former suppresses reception power of the multipath waves.

According to an aspect of the present invention, in the above-described underwater acoustic communication system, the beam former increases a Signal-to-Interference plus Noise power Ratio of the direct waves.

According to an aspect of the present invention, a reception device includes M (M is an integer of two or more) receivers configured to receive M reception signal sequences corresponding to N (N is an integer of two or more) transmission signal sequences transmitted from N transmitters through sound waves, a beam former configured to suppress multipath waves other than direct waves of the M received reception signal sequences and to generate L (L is an integer of two or more) signal sequences from the M reception signal sequences, and a signal estimation unit configured to estimate the N transmission signal sequences based on the L generated signal sequences.

Effects of the Invention

According to the present invention, it is possible to improve efficiency of underwater spatial multiplex transmission.

DESCRIPTION OF EMBODIMENTS

An embodiment of the present invention is described in detail with reference to drawings.

Figure 1:
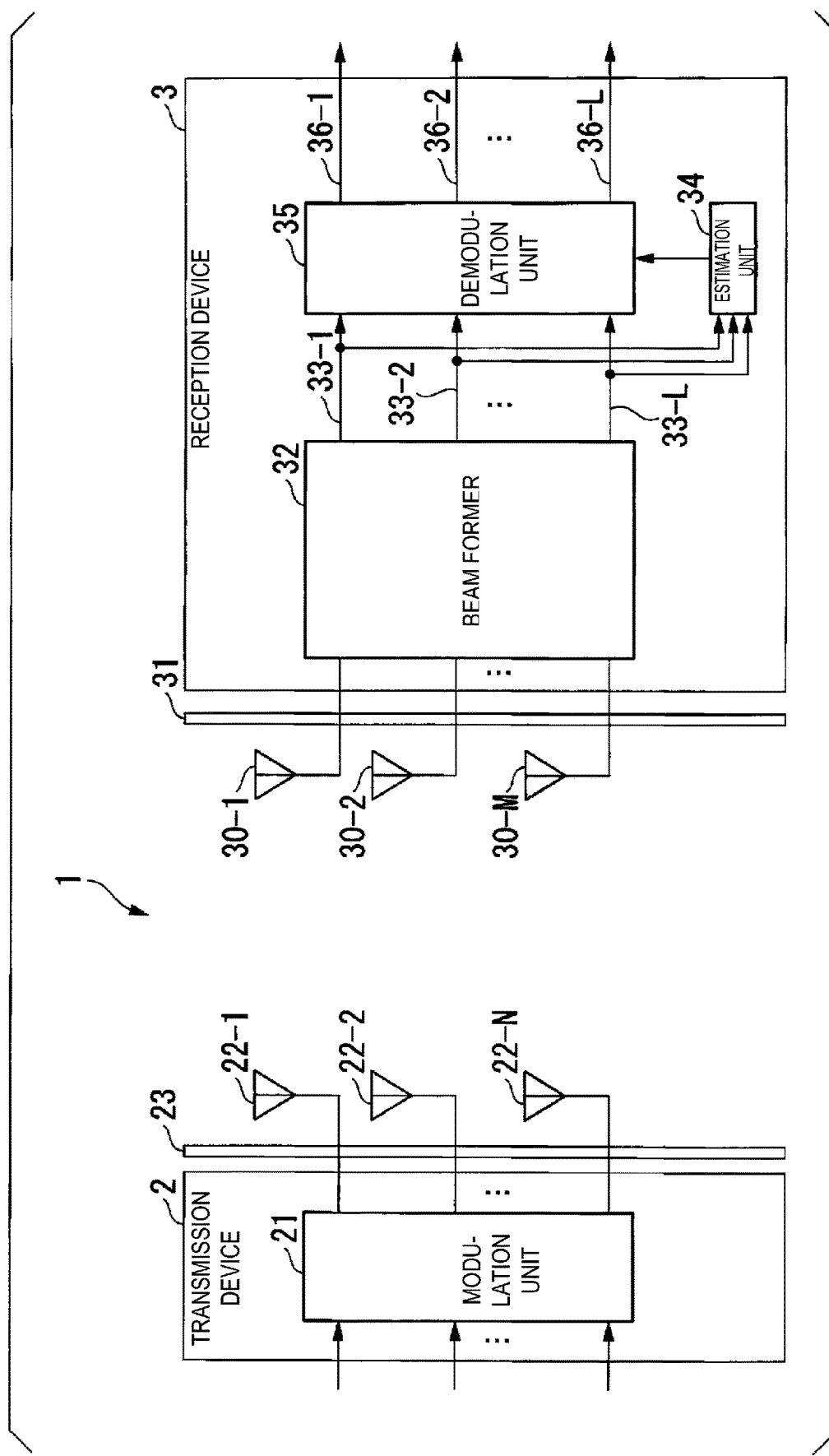
FIG. 1 is a diagram illustrating a configuration example of an underwater acoustic communication system according to an embodiment.

FIG. 1 is a diagram illustrating a configuration example of an underwater acoustic communication system (hydroacoustic communication system) 1. The underwater acoustic communication system 1 is a system performing underwater acoustic communication. The underwater acoustic communication system 1 uses a sound wave as a carrier wave. The underwater acoustic communication system 1 spatially multiplexes a plurality of transmission signal sequences by multiplexing technology such as MIMO using a plurality of transmitters and receivers. The underwater acoustic communication system 1 includes a transmission device 2 and a reception device (receiving apparatus) 3. In the following, a distance (link distance) between the transmission device 2 and the reception device 3 is, for example, a distance R.

A portion or all of functional units of the transmission device 2 and the reception device 3 are realized when a processor such as a CPU (Central Processing Unit) executes programs stored in a storage unit. A portion or all of the functional units of the transmission device 2 and the reception device 3 may be realized by hardware such as LSI (Large Scale Integration) and ASIC (Application Specific Integrated Circuit).

The storage unit is preferably a nonvolatile recording medium (non-transitory recording medium) such as a flash memory and an HDD (Hard Disk Drive). The storage unit may include a volatile recording medium such as a RAM (Random Access Memory). The storage unit stores, for example, signal sequences and programs.

The transmission device 2 is a device that transmits the plurality of transmission signal sequences by using sound waves. The transmission device 2 spatially multiplexes the plurality of transmission signal sequences by the multiplexing technology such as MIMO. The transmission device 2 is installed in water such as seawater (e.g., near water surface or near bottom of water). The transmission device 2 emits the plurality of spatially multiplexed transmission signal sequences into water by using the sound waves. The transmission device 2 includes a modulation unit 20, transmitters 21-1 to 21-N, and a sound collection member 22. In the following, an interval of the transmitters 21 is, for example, a distance $d_t$.

The modulation unit 20 acquires the plurality of transmission signal sequences from an external device. The modulation unit 20 modulates the plurality of spatially multiplexed transmission signal sequences by a predetermined modulation scheme such as Orthogonal Frequency Division Multiplexing (OFDM).

The transmitters 21-1 to 21-N (transmission antennae) transmit N modulated transmission signal sequences (modulation signals) by using the sound waves. The sound waves transmitted from the N transmitters 21 propagate in water. In a case where the transmission device 2 is installed near the bottom of water, each of the transmitters 21 may have sound wave directivity at which the sound waves are hardly emitted toward the bottom of water. In a case where the transmission device 2 is installed near the water surface, each of the transmitters 21 may have sound wave directivity at which the sound waves are hardly emitted toward the water surface. The transmitters 21 may include the sound collection member 22 on rear surfaces of the transmitters 21. For example, in a case where the transmitters 21 transmit the N transmission signal sequences from near the bottom of water to the water surface, the N transmitters 21 include the sound collection member 22 on the bottom of water side of the transmitters 21. For example, in a case where the transmitters 21 transmit the N transmission signal sequences from near the water surface toward the bottom of water, the N transmitters 21 include the sound collection member 22 on the water surface side of the transmitters 21. The sound collection member 22 is made of a material (e.g., rubber) absorbing sound. The sound collection member 22 has, for example, a flat surface shape. The sound collection member 22 can suppress reflection of the sound waves by the water surface or the bottom of water.

The reception device 3 is a device receiving the plurality of transmission signal sequences spatially multiplexed by MIMO, by using the sound waves. The reception device 3 is installed in water such as seawater (e.g., near water surface or near bottom of water). The reception device 3 receives the plurality of spatially multiplexed transmission signal sequences through water. The reception device 3 includes receivers 30-1 to 30-M, a sound collection member 31, a beam former 32, communication lines 33-1 to 33-L (L is an integer of two or more), an estimation unit 34, a demodulation unit 35, and communication lines 36-1 to 36-N. The reception device 3 includes the beam former 32 in a preceding stage of the estimation unit 34 and the demodulation unit 35 in a flow of signal processing to the signal sequences.

In the following, an interval of the receivers 30 is, for example, a distance $d_r$. The interval $d_t$ of the transmitters 21 and the interval $d_r$ of the receivers 30 may be determined in accordance with standards of Los-MIMO (Line-of-sight MIMO). In other words, a result value ($=d_t \times d_r$) obtained by multiplying the interval $d_t$ of the transmitters 21 and the interval $d_r$ of the receivers 30 may be an integer multiple of a result value ($=\lambda \times R/M$) obtained by dividing a result value obtained by multiplying a wavelength $\lambda$ of the sound waves and the distance R between the transmitters 21 and the receivers 30 by the number "M" of receivers 30. In the case where the interval of the transmitters 21 and the interval of the receivers 30 are determined in accordance with the standards of the Los-MIMO, the underwater acoustic communication system 1 can improve efficiency of underwater spatial multiplex transmission as compared with a case where the interval of the transmitters 21 and the interval of the receivers 30 are not determined in accordance with the standards of the Los-MIMO.

The receivers 30-1 to 30-M (reception antennae) receive the N transmission signal sequences emitted from the transmitters 21-1 to 21-N as M reception signal sequences by using the sound waves. The receivers 30-1 to 30-M output the M received reception signal sequences to the beam former 32.

In a case where the reception device 3 is installed near the bottom of water, the receivers 30 may have sound wave directivity at which the sound waves are hardly emitted toward the bottom of water. In a case where the reception device 3 is installed near the water surface, the receivers 30 may have sound wave directivity at which the sound waves are hardly emitted toward the water surface. The receives 30 may include the sound collection member 22 on rear surfaces of the receivers 30. For example, in a case where the receivers 30 receive the M reception signal sequences near the bottom of water, the M receivers 30 include the sound collection member 31 on the bottom of water side of the receivers 30. For example, in a case where the receivers 30 receive the M reception signal sequences near the water surface, the M receivers 30 include the sound collection member 31 on the water surface side of the receivers 30. The sound collection member 31 is made of a material (e.g., rubber) absorbing sound. The sound collection member 31 has, for example, a flat surface shape. The sound collection member 31 can suppress reflection of the sound waves by the water surface or the bottom of water.

The beam former 32 generates L (L is an integer of two or more) signal sequences (internal signal sequences) from direct waves (desired waves) of the M reception signal sequences received by the M receivers 30. The beam former 32 generates L signal sequences $y_1(t)$ by arrival direction estimation processing (blind processing) such as MUSIC (MUltiple SIgnal Classification) method and ESPRIT (Estimation of Signal Parameters via Rotational Invariance Techniques). The beam former 32 outputs the L signal sequences $y_1(t)$ to the estimation unit 34 and the demodulation unit 35 through the communication lines 33-1 to 33-L.

In the underwater acoustic communication, arrival directions of multipath waves are less varied with time. Accordingly, the beam former 32 can estimate the arrival directions of the multipath waves by the arrival direction estimation processing such as the MUSIC method and the ESPRIT.

The beam former 32 spatially suppresses the multipath waves (multiple arrival waves) other than the direct waves of the M reception signal sequences received by the M receivers 30. The beam former 32 estimates arrival directions $\theta_1$ to $\theta_{M-L}$ of the multipath waves other than the direct waves of the M reception signal sequences by the arrival direction estimation processing. The beam former 32 derives a weight matrix W to suppress the multipath waves based on Formula (1) and Formula (2).

[Formula 1]

$$W = null\langle [a_k\ a_k\ ...a_k]\rangle \qquad (1)$$

[Formula 2]

$$a_k = \left[1\ \exp\left\{j2\pi \frac{d_r\ \sin\theta_k}{\lambda}\right\}\ \cdots\ \exp\left\{j2\pi(M-1)\frac{d_r\ \sin\theta_k}{\lambda}\right\}\right] \qquad (2)$$

In the formula, null (A) represents an orthogonal basis of a subspace orthogonal to the "A". The beam former 32 derives the L signal sequences $y_1(t)$ from the M reception signal sequences $x_m(t)$ based on the weight matrix W as expressed in Formula (3).

[Formula 3]

$$[y_1(t)y_2(t)\ ...\ y_L(t)] = W^H \cdot [x_1(t)x_2(t)\ ...\ x_M(t)] \qquad (3)$$

Figure 2:
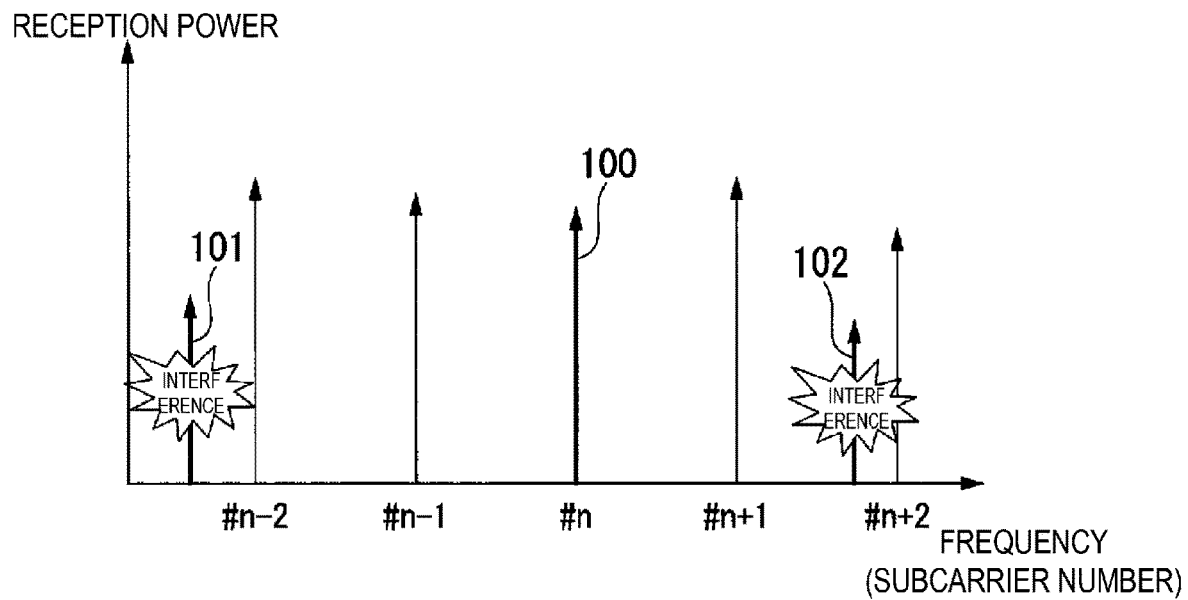
FIG. 2 is a diagram illustrating examples of a direct wave signal not suppressed in reception power according to the present embodiment.

FIG. 2 is a diagram illustrating an example of a direct wave signal 100 not suppressed in reception power. In FIG. 2, a lateral axis of a graph represents a frequency of a sound wave serving as a carrier wave. A vertical axis of the graph represents the reception power. For comparison with FIG. 3, the beam former 32 does not suppress the reception power of the multipath waves other than the direct waves of the M reception signal sequences in FIG. 2. Therefore, a multipath wave signal 101 and a multipath wave signal 102 leak to subcarriers adjacent on the frequency axis, used for transmission of the data signals.

Figure 3:
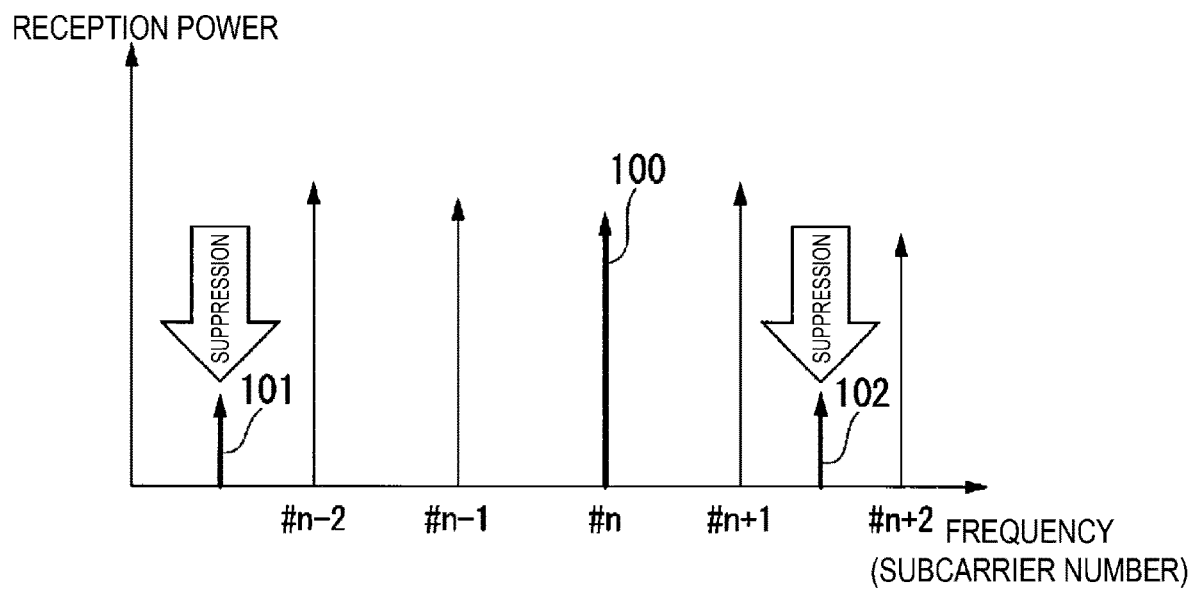
FIG. 3 is a diagram illustrating examples of a direct wave signal suppressed in reception power according to the present embodiment.

FIG. 3 is a diagram illustrating an example of the reception power of the direct wave signal 100 suppressed in reception power. In FIG. 3, a lateral axis of a graph represents a frequency of a sound wave serving as a carrier wave. A vertical axis of the graph represents the reception power. The beam former 32 projects beams of sound waves to a complementary space of a subspace spanned by the multipath waves of the M reception signal sequences (subspace spanned by direct waves of M reception signal sequences) in an underwater propagation-path space. In other words, the beam former 32 suppresses the reception power of the multipath waves other than the direct waves of the M reception signal sequences. In FIG. 3, the beam former 32 suppresses the reception power of the multipath wave signal 101 and the multipath wave signal 102. As a result, the beam former 32 can prevent the multipath wave signal 101 and the multipath wave signal 102 from leaking to the subcarriers adjacent on the frequency axis, used for transmission of the data signals.

The beam former 32 may project the beams of the sound waves to a subspace (subspace spanned by direct waves) where a Signal-to-Interference plus Noise power Ratio (SINR) of the direct waves (dominant waves) of the M reception signal sequences in the underwater propagation-path space becomes the maximum. In other words, the beam former 32 may increase the Signal-to-Interference plus Noise power Ratio of the direct waves of the M reception signal sequences. In FIG. 3, the beam former 32 may increase the Signal-to-Interference plus Noise power Ratio of the direct wave signal 100. The beam former 32 may perform, for example, Minimum Mean Square Error (MMSE).

Referring back to FIG. 1, description of the configuration example of the underwater acoustic communication system 1 is continued.

The communication lines 33-1 to 33-L transmit the L signal sequences to the estimation unit 34 and the demodulation unit 35. The estimation unit 34 (signal estimation unit) estimates the underwater propagation path responses based on the L signal sequences generated from the direct waves of the M reception signal sequences. The estimation unit 34 outputs estimation results of the underwater propagation path responses to the demodulation unit 35. As illustrated in FIG. 3, a beam former 122 suppresses the multipath wave 101 and the multipath wave 102 as interference waves, which prevents the multipath waves from leaking to the adjacent subcarriers. Accordingly, the estimation unit 34 can improve estimation accuracy of the propagation path responses.

The demodulation unit 35 (signal estimation unit) demodulates the N transmission signal sequences (separates signals) from the L signal sequences based on the estimation results of the propagation path responses. The demodulation processing performed by the demodulation unit 35 is not limited to specific demodulation processing as long as the demodulation processing corresponds to the modulation processing on the transmission signal sequences. As illustrated in FIG. 3, the beam former 122 suppresses the multipath waves as the interference waves, which prevents the multipath waves from leaking to the adjacent subcarriers. Accordingly, the demodulation unit 35 can demodulate the spatially multiplexed transmission signal sequences by optional demodulation processing corresponding to the modulation processing on the transmission signal sequences.

The demodulation unit 35 outputs the N transmission signal sequences as demodulation results to a predetermined external device through the communication lines 36-1 to 36-N. The communication lines 36-1 to 36-N transmit the N transmission signal sequences as the demodulation results by the demodulation unit 35, to the predetermined external device.

Next, reduction of a capacity (transmission capacity) of each of the propagation paths in the spatial multiplex transmission in a case where the multipath waves are suppressed is described.

A capacity C of each of the propagation paths in the spatial multiplex transmission is expressed by Formula (4).

[Formula 4]

$$C = \log_2 \det\left(I_{N_r} + \frac{P_t}{N_t \sigma_n^2} HH^H\right) = \sum_{q=1}^{Q} \log_2\left(1 + \frac{P_t \lambda_q}{N_t \sigma_n^2}\right) \quad (4)$$

In the formula, Pt represents transmission power of the transmission signal sequences, H represents a propagation path response matrix (propagation channel response matrix), $\sigma_n^2$ represents noise power, I represents a unit matrix, and $\lambda_q$ represents a q-th eigenvalue of the propagation path response matrix H.

In a propagation path where a large number of multipath waves are present, second and subsequent eigenvalues are present in the propagation path response matrix. In this case, the underwater acoustic communication system 1 can increase the capacity of each of the propagation paths by performing the spatial multiplex transmission. In a case where the propagation paths completely independent of each other are formable, all of eigenvalues in the propagation path response matrix are the same.

In a propagation path where no multipath wave is present, the second and subsequent eigenvalues are extremely small. In this case, the underwater acoustic communication system 1 cannot increase the capacity of each of the propagation paths even by performing the spatial multiplex transmission. Therefore, in the case where the beam former 32 suppresses the multipath waves, it is difficult for the underwater acoustic communication system 1 to perform the spatial multiplex transmission.

Therefore, in the case where the beam former 32 suppresses the multipath waves, the interval of the transmitters 22 and the interval of the receivers 30 are each determined to a geometrically appropriate interval. When the path difference between the transmitters 22 and the receivers 30 is set to the appropriate distance, the underwater acoustic communication system 1 forms the propagation paths independent of each other even in the case where the beam former 32 suppresses the multipath waves. This makes it possible to increase the capacity of each of the propagation paths by the spatial multiplex transmission.

The relationship of the wavelength λ, the distance R between the transmission device 2 and the reception device 3, and the number M of the receivers 30 is expressed by Formula (5).

[Formula 5]

$$d_t d_r = \alpha \frac{\lambda R}{M} \quad (5)$$

In the formula, α represents an optional natural number. In a case where the relationship expressed by Formula (5) is satisfied, the underwater acoustic communication system 1 can form the propagation paths independent of each other.

A propagation path response vector (propagation channel response vector) $h_l$ from an l-th transmitter 22 to each of the M receivers 30 is expressed by Formula (6).

[Formula 6]

$$h_l = [1 e^{-2\pi j \sin(\theta_l) d_r/\lambda} \ldots e^{-2\pi j (M-1)\sin(\theta_l) d_r/\lambda}] \quad (6)$$

In the formula, $\theta_l$ represents an arrival direction of the sound wave from the l-th transmitter 22 in each of the receivers 30.

In the propagation paths independent of each other, a result of inner product of the propagation path response vectors from the different transmitters 22 to each of the M receivers 30 becomes zero as expressed in Formula (7).

[Formula 7]

$$\langle h_l, h_{l+1} \rangle = \sum_{m=0}^{M-1} e^{2\pi j}[\sin(\theta_{l+1}) - \sin(\theta_l)]m(d_r/\lambda) = 0 \quad (7)$$

In a case where the arrival direction $\theta_l$ is sufficiently small, Formula (5) can be approximated to Formula (8) with use of an arrival direction $\theta_1$.

[Formula 8]

$$\sin(\theta_l) \approx \theta_1 + \frac{(l-1)d_t}{R} \quad (8)$$

Formula (7) is expressed as Formula (9) based on Formula (8).

[Formula 9]

$$\sum_{m=0}^{M-1} e^{2\pi j m}(d_t d_r/\lambda R) = 0 \quad (9)$$

In the formula, $d_r$ represents the interval of the receivers 22, and $d_t$ represents the interval of the transmitters 30. In a case where the interval of the receivers 22 and the interval of the transmitters 30 satisfy Formula (9), Formula (5) is derived.

Next, an operation example of the underwater acoustic communication system 1 is described.

Figure 4:
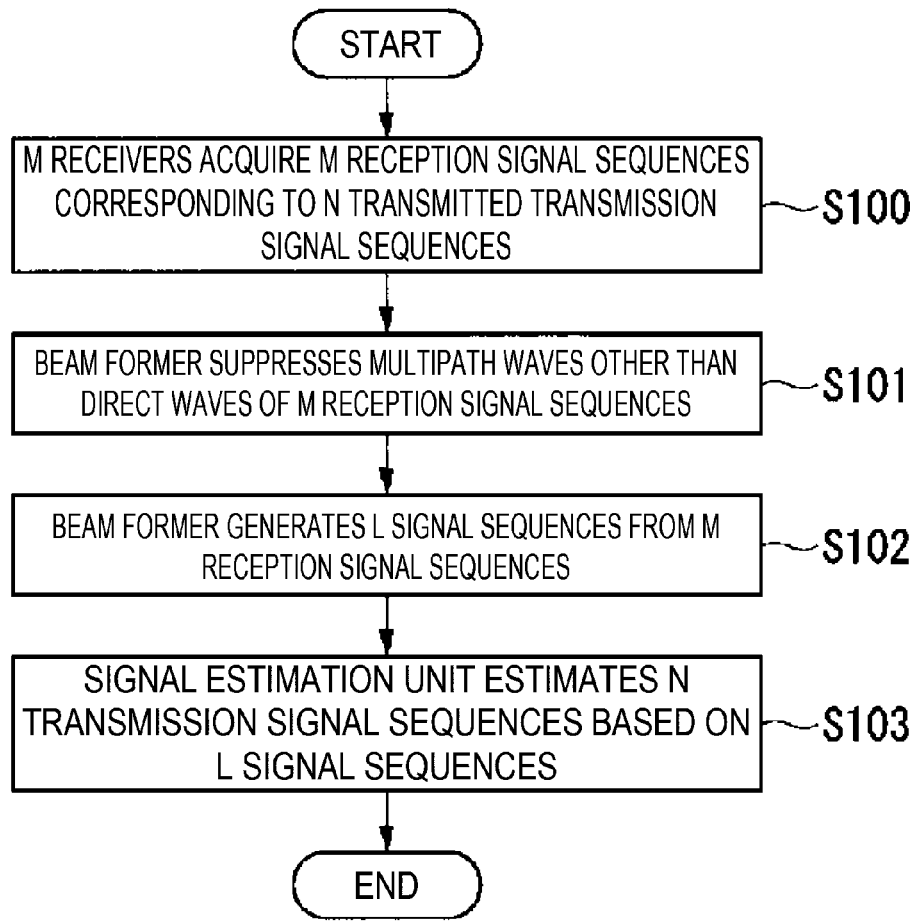
FIG. 4 is a flowchart illustrating an operation example of the underwater acoustic communication system according to the present embodiment.
Figure 5:
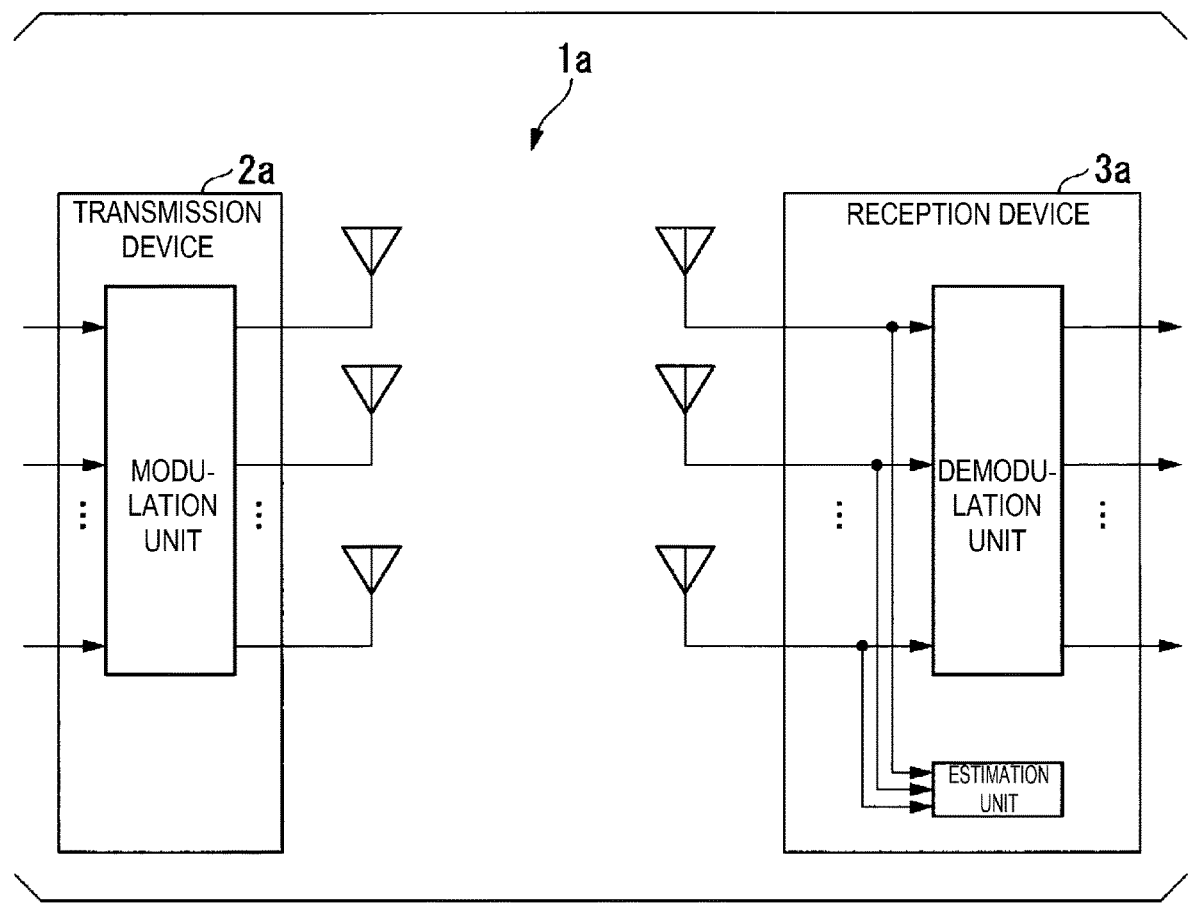
FIG. 5 is a diagram illustrating a configuration example of an existing underwater acoustic communication system.
Figure 6:
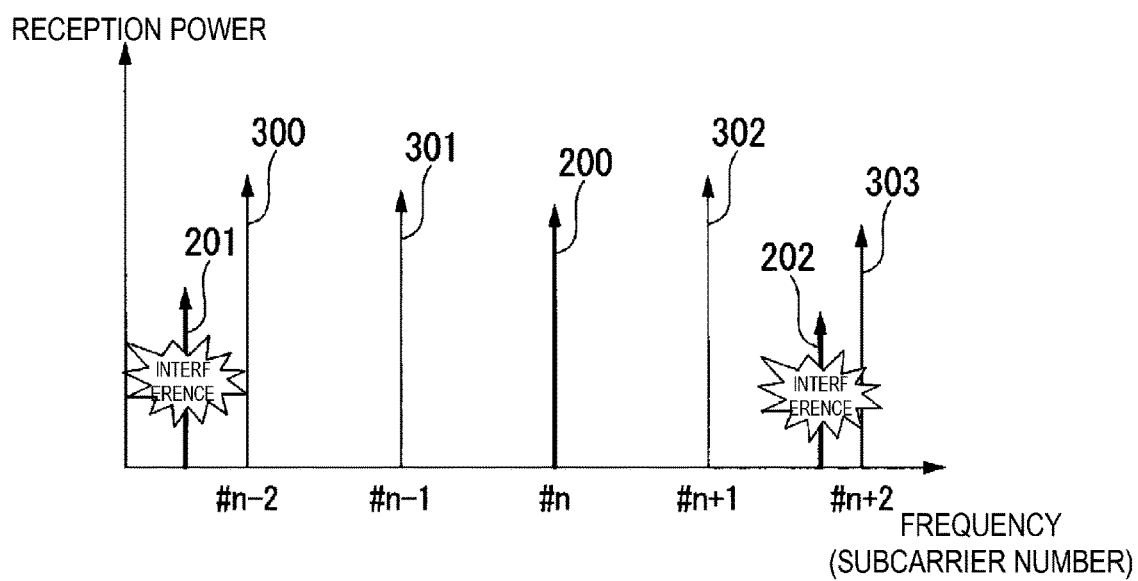
FIG. 6 is a diagram illustrating examples of a direct wave signal of a pilot signal and a multipath wave of the pilot signal in an existing technology.

FIG. 4 is a flowchart illustrating the operation example of the underwater acoustic communication system 1. The M receivers 30 acquire the M reception signal sequences corresponding to the N transmitted transmission signal sequences (step S100). The beam former 32 suppresses the multipath waves other than the direct waves of the M reception signal sequences (step S101). The beam former 32 generates the L signal sequences from the M reception signal sequences (step S102) The estimation unit 34 and the demodulation unit 35 (signal estimation unit) estimate the N transmission signal sequences based on the L signal sequences (step S103).

As described above, the underwater acoustic communication system 1 according to the embodiment includes the transmission device 2 and the reception device 3. The transmission device 2 includes the N transmitters 22. The reception device 3 includes the M receivers 30, the beam former 32, and the estimation unit (signal estimator) 34 and the demodulation unit (signal estimator) 35. The M receivers 30 receive the M reception signal sequences corresponding to the N transmission signal sequences that are transmitted from the N transmitters 22 by using the sound waves. The beam former 32 suppresses the multipath waves other than the direct waves of the M received reception signal sequences. The beam former 32 generates the L signal sequences from the M reception signal sequences. The estimation unit 34 and the demodulation unit 35 estimate the N transmission signal sequences based on the L generated signal sequences.

As described above, since the beam former 32 suppresses the multipath waves other than the direct waves of the M reception signal sequences, the underwater acoustic communication system 1 can prevent the multipath waves of the reception signal sequences from leaking to the subcarriers adjacent on the frequency axis, used for transmission of the data signals.

As a result, the underwater acoustic communication system 1 can improve efficiency of the underwater spatial multiplex transmission. The underwater acoustic communication system 1 can spatially multiplex the plurality of transmission signal sequences by Line-of-sight MIMO even in seawater and the like where estimation of the propagation path responses of the multipath waves is difficult.

A result value obtained by multiplying the interval $d_t$ of the transmitters 22 and the interval $d_r$ of the receivers 30 may be an integer multiple of a result value ($=\lambda \times R/M$) obtained by dividing a result value obtained by multiplying the wavelength $\lambda$ of the sound waves and the distance R between the transmitters 22 and the receivers 30 by the number of receivers 30. As a result, even in the case where the beam former 32 suppresses the multipath waves, the underwater acoustic communication system 1 secures eigenvalues of the propagation path response matrix of the spatially multiplexed sound waves. This makes it possible to improve efficiency of underwater spatial multiplex transmission.

The underwater acoustic communication system, the transmission device, and the reception device according to the above-described embodiment may be realized by computers. In this case, programs to realize the functions of the underwater acoustic communication system, the transmission device, and the reception device may be recorded in a computer-readable recording medium, and a computer system may read and execute the programs recorded in the recording medium to realize the functions. Note that the "computer system" described herein includes OS and hardware such as peripherals. In addition, the "computer-readable recording medium" includes a portable medium such as a flexible disk, a magnetooptical disk, a ROM, and a CD-ROM, and a storage device incorporated in the computer system, such as a hard disk. Further, the "computer-readable recording medium" may also include a communication line for dynamically holding a program over a short period of time, such as a communication line for transmitting programs through a network such as the Internet, or a communication line such as a telephone line, and a volatile memory for holding a program over a certain period of time, such as a volatile memory inside a computer system serving as a server or a client in this case. Further, the above-described programs may be programs to realize a portion of the above-described functions, may be programs that can realize the above-described functions in combination with programs already recorded in the computer system, or may be programs realized with use of a programmable logic device such as FPGA (Field Programmable Gate Array).

Although the preferred embodiment of the present invention has been described in detail with reference to drawings, the specific configuration is not limited to the configuration according to the embodiment, and includes designs and the like without departing from the scope of the present invention.

INDUSTRIAL APPLICABILITY

The present invention is applicable to a system that performs acoustic communication in water such as seawater.

REFERENCE SIGNS LIST

1 Underwater acoustic communication system
1a Underwater acoustic communication system
2 Transmission device
2a Transmission device
3 Reception device
3a Reception device
20 Modulation unit
20 Transmitter
21 Sound collection member
30 Transmitter
31 Sound collection member
32 Beam former
33 Communication line
34 Estimation unit
35 Demodulation unit
36 Communication line
100 Direct wave signal
101 Multipath wave signal
102 Multipath wave signal
200 Direct wave signal
201 Multipath wave signal
202 Multipath wave signal
300 to 303 Data signal

The invention claimed is:

1. An underwater acoustic communication system, comprising:
  a transmission device including N (N is an integer of two or more) transmitters; and
  a reception device, wherein
  the reception device comprises:
  M (M is an integer of two or more) receivers configured to receive M reception signal sequences corresponding to N transmission signal sequences transmitted from the N transmitters through sound waves;
  a beam former configured to suppress multipath waves other than direct waves of the M received reception signal sequences and to generate L (L is an integer of two or more) signal sequences from the M reception signal sequences; and
  a signal estimator configured to estimate the N transmission signal sequences based on the L generated signal sequences,
  wherein each of the N transmitters, the M receivers, the beam former and the signal estimator is implemented by:
  i) computer executable instructions executed by at least one processor,
  ii) at least one circuitry or
  iii) a combination of computer executable instructions executed by at least one processor and at least one circuitry,
  wherein a result value obtained by multiplying an interval of the transmitters and an interval of the receivers is an integer multiple of a result value obtained by dividing a result value obtained by multiplying a wavelength of the sound waves and a distance between the transmitters and the receivers, by a number of the receivers.

2. The underwater acoustic communication system according to claim 1, wherein:
   in a case where the transmission device is installed near a bottom of water, the N transmitters each have directivity of a sound wave directed toward a water surface; and
   in a case where the reception device is installed near the water surface, the M receivers each have directivity of a sound wave arriving from the bottom of water.

3. The underwater acoustic communication system according to claim 1, wherein:
   in a case where the transmission device is installed near a water surface, the N transmitters each have directivity of a sound wave directed toward a bottom of water; and
   in a case where the reception device is installed near the bottom of water, the M receivers each have directivity of a sound wave arriving from the water surface.

4. The underwater acoustic communication system according to claim 1, wherein:
   the beam former suppresses reception power of the multipath waves.

5. The underwater acoustic communication system according to claim 1, wherein:
   the beam former increases a Signal-to-Interference plus Noise power Ratio of the direct waves.

6. A reception device, comprising:
   M (M is an integer of two or more) receivers configured to receive M reception signal sequences corresponding to N (N is an integer of two or more) transmission signal sequences transmitted from N transmitters through sound waves;
   a beam former configured to suppress multipath waves other than direct waves of the M received reception signal sequences and to generate L (L is an integer of two or more) signal sequences from the M reception signal sequences; and
   a signal estimator configured to estimate the N transmission signal sequences based on the L generated signal sequences,
   wherein each of the N transmitters, the M receivers, the beam former and the signal estimator is implemented by:
   i) computer executable instructions executed by at least one processor,
   ii) at least one circuitry or
   iii) a combination of computer executable instructions executed by at least one processor and at least one circuity,
   wherein a result value obtained by multiplying an interval of the transmitters and an interval of the receivers is an integer multiple of a result value obtained by dividing a result value obtained by multiplying a wavelength of the sound waves and a distance between the transmitters and the receivers, by a number of the receivers.

7. The reception device according to claim 6, wherein:
   in a case where a transmission device including the N transmitters is installed near a bottom of water, the N transmitters each have directivity of a sound wave directed toward a water surface; and
   in a case where the reception device is installed near the water surface, the M receivers each have directivity of a sound wave arriving from the bottom of water.

8. The reception device according to claim 6, wherein:
   in a case where a transmission device including the N transmitters is installed near a water surface, the N transmitters each have directivity of a sound wave directed toward a bottom of water; and
   in a case where the reception device is installed near the bottom of water, the M receivers each have directivity of a sound wave arriving from the water surface.

9. The reception device according to claim 6, wherein:
   the beam former suppresses reception power of the multipath waves.

10. The reception device according to claim 6, wherein:
    the beam former increases a Signal-to-Interference plus Noise power Ratio of the direct waves.

* * * * *